(12) United States Patent
Chen

(10) Patent No.: US 10,870,459 B2
(45) Date of Patent: Dec. 22, 2020

(54) LEARNING AID FOR CENTRAL WHEEL STRUCTURE AUTO-BALANCING DEVICE AND AUTO-BALANCING DEVICE HAVING SAME

(71) Applicant: Shane Chen, Camas, WA (US)

(72) Inventor: Shane Chen, Camas, WA (US)

( * ) Notice: Subject to any disclaimer, the term of this patent is extended or adjusted under 35 U.S.C. 154(b) by 0 days.

(21) Appl. No.: 15/829,871

(22) Filed: Dec. 1, 2017

(65) Prior Publication Data

US 2018/0154973 A1 Jun. 7, 2018

Related U.S. Application Data

(60) Provisional application No. 62/428,937, filed on Dec. 1, 2016.

(51) Int. Cl.
  *B62K 11/00* (2006.01)
  *B62H 1/12* (2006.01)
  *B62K 1/00* (2006.01)

(52) U.S. Cl.
  CPC .............. *B62K 11/007* (2016.11); *B62H 1/12* (2013.01); *B62K 1/00* (2013.01)

(58) Field of Classification Search
  CPC .................................................... B62K 11/007
  See application file for complete search history.

(56) References Cited

U.S. PATENT DOCUMENTS

| | | | | |
|---|---|---|---|---|
| 4,657,272 A | * | 4/1987 | Davenport | B62K 5/02 280/266 |
| D289,985 S | * | 5/1987 | Davenport | D12/107 |
| 4,863,182 A | * | 9/1989 | Chern | A63C 17/006 280/266 |
| 7,226,067 B2 | * | 6/2007 | Pickering | B62H 1/12 280/293 |
| 7,641,213 B1 | * | 1/2010 | Chen | B62H 1/12 280/293 |
| 8,240,407 B2 | * | 8/2012 | Takenaka | B60B 19/003 180/10 |
| 8,336,894 B2 | * | 12/2012 | Wernli | B62K 3/002 280/87.021 |
| 8,376,384 B2 | * | 2/2013 | Tsai | B62H 1/12 280/293 |
| 8,459,667 B2 | * | 6/2013 | Ungar | B62K 1/00 280/87.01 |
| 8,523,212 B2 | * | 9/2013 | Ryan | B62K 15/008 180/206.1 |
| 8,973,695 B2 | * | 3/2015 | Aloni | B62H 7/00 180/180 |
| D739,307 S | * | 9/2015 | Hoffmann | D12/107 |
| 9,387,363 B1 | * | 7/2016 | Polinsky | A63B 26/003 |
| 9,744,402 B2 | * | 8/2017 | Klassen | A63B 22/16 |

(Continued)

*Primary Examiner* — Nicole T Verley
(74) *Attorney, Agent, or Firm* — Steven J. Sullivan

(57) ABSTRACT

A training aid to teach balancing skills for a central wheel structure auto-balancing device and an auto-balancing device having same. The training aids may be variously configured and may be releasably or fixedly coupled to the foot platforms of the auto-balancing device. Disclosed embodiments include various ground contact members and various support structures that hold the ground contacting members. The training aids may be compressive and/or offer ground resistance. The height of the aids, their compressive strength and/or their resistance, among other features, may be adjusted.

21 Claims, 3 Drawing Sheets

(56) References Cited

U.S. PATENT DOCUMENTS

| | | | |
|---|---|---|---|
| 9,868,021 B2* | 1/2018 | Lugton | A63B 22/06 |
| 9,932,087 B2* | 4/2018 | Alvarez-Icaza | B62M 29/00 |
| 2002/0070514 A1* | 6/2002 | Costa, Jr. | A63C 17/004 |
| | | | 280/11.226 |
| 2017/0213477 A1* | 7/2017 | Honeycutt | B62K 11/007 |
| 2018/0215434 A1* | 8/2018 | Chen | B62K 11/007 |
| 2018/0251182 A1* | 9/2018 | Chen | B62K 11/007 |

* cited by examiner

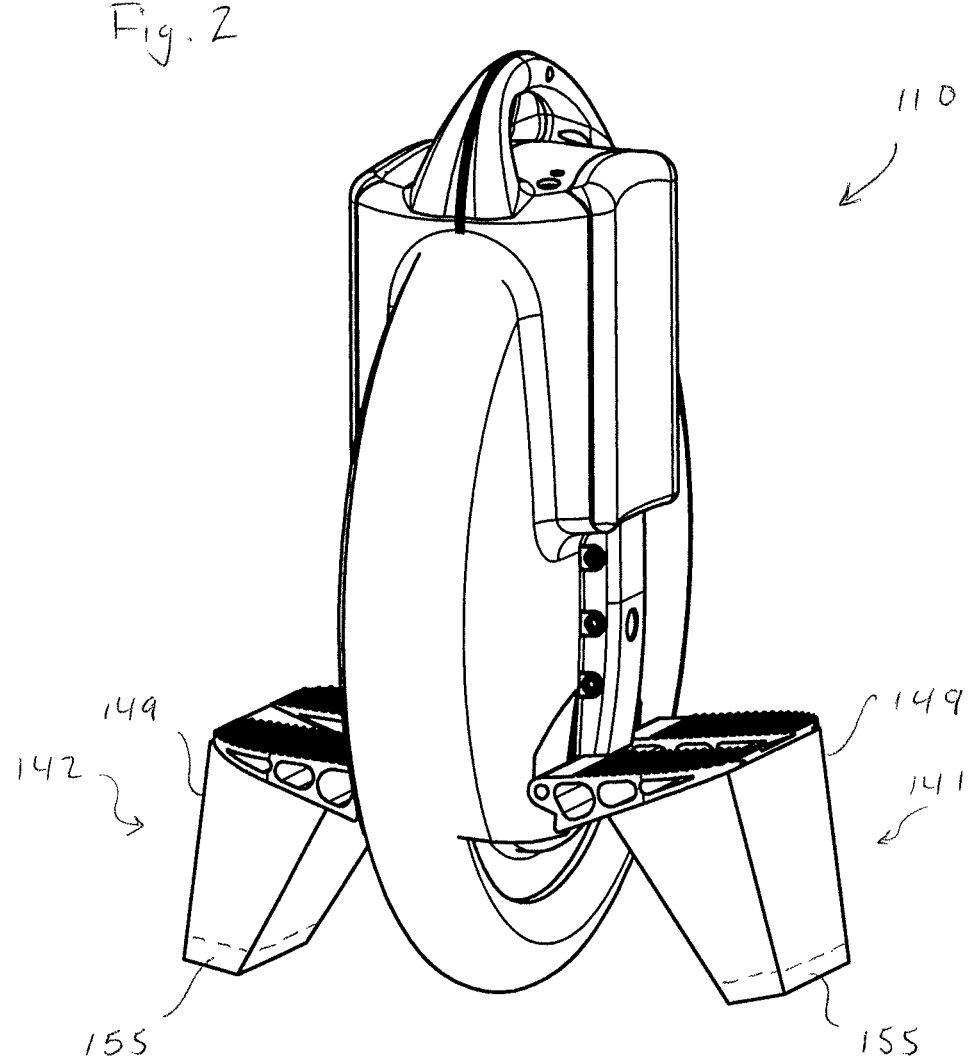

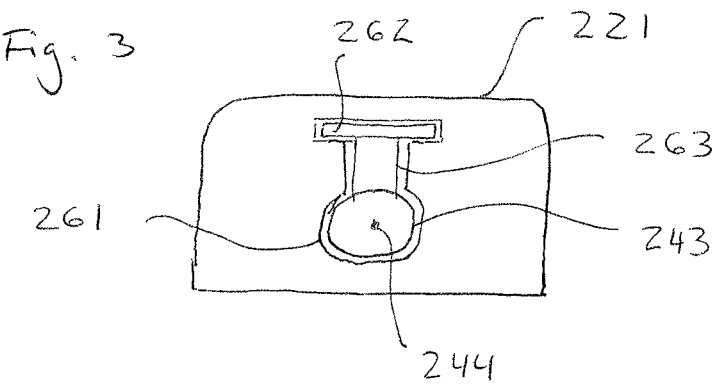
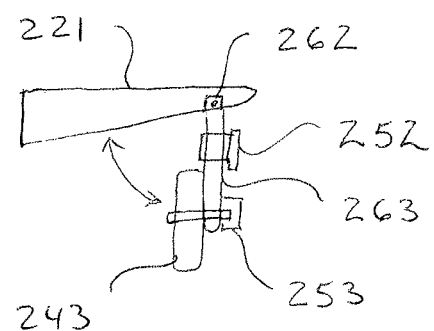
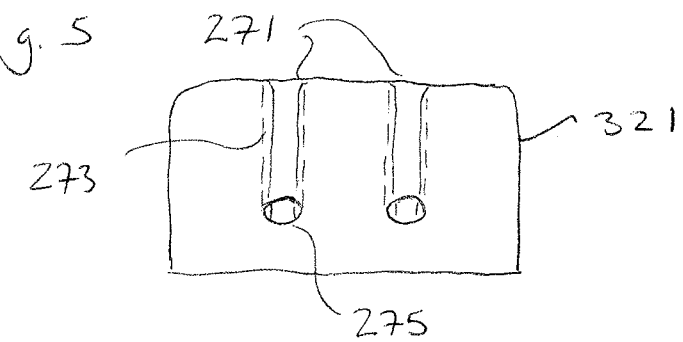

US 10,870,459 B2

LEARNING AID FOR CENTRAL WHEEL STRUCTURE AUTO-BALANCING DEVICE AND AUTO-BALANCING DEVICE HAVING SAME

CROSS REFERENCE TO RELATED APPLICATIONS

This application claims the benefit of U.S. Provisional Application No. 62/428,937, filed Dec. 1, 2016, entitled Pedal Resistance System for Self-Balancing Unicycle Device and having the inventor as above.

FIELD OF THE INVENTION

The present invention relates to learning how to ride a central wheel structure auto-balancing transportation device and, more specifically, to riding aids that may extend from such devices.

BACKGROUND OF THE INVENTION

The prior art includes U.S. Pat. No. 8,807,250, issued to Chen for a Powered Single-Wheeled Self-Balancing Vehicle for Standing User (the '250 patent), and U.S. Patent Application pub. no. 2016/0332690, submitted by Chen for a Fore-Aft Self-Balancing Transportation Device with Low and Centered Foot Platform. These documents are hereby incorporated by reference as though disclosed herein. The devices disclosed in these documents may be generally referred to as central wheel structure ("CWS") auto-balancing devices.

A CWS auto-balancing device typically has a single wheel structure (having one or more tires) and first and second foot platforms positioned on opposite sides of that wheel structure. In contrast to learning how to ride a bicycle, which has a front and back wheel and hence fore-aft stability, a CWS auto-balancing device requires learning how to achieve both fore-aft and side-to-side stability.

"Training wheels" may be employed in teaching how to ride a bicycle. While termed "training wheels," these wheels do not actually teach the balancing required to ride a bike but rather provide security against falling sideways while a rider figures out for him or herself how to balance. Accordingly, they would be better termed "security wheels." Balancing on a bicycle comes from turning the steering wheel toward the side to which one is falling, which moves the wheels towards the center of gravity and, by centrifugal force, moves the center of gravity away from the "falling" side.

In a CWS auto-balancing device, the need for an effective balancing training aid is more critical than in a bicycle because a rider is learning to balance both in fore-aft and side-to-side, simultaneously. In addition, in a CWS device (of the type shown), there is no handlebar for balance support or to achieve turning. Balance to remain erect and to execute a turn, must be learned.

A need does exist for providing security to a rider of a CWS auto-balancing device while that rider is learning how to operate one. A more critical need exists, however, for actually teaching a rider the balancing skills required to competently and confidently ride such a device.

SUMMARY OF THE INVENTION

Accordingly, it is an object of the present invention to provide a training aid for a central wheel structure auto-balancing device that overcomes the shortcomings of the prior art.

It is another object of the present invention to provide a training aid for a central wheel structure auto-balancing device that affords stability while teaching a rider balancing techniques.

It is also an object of the present invention to provide a training aid for a central wheel structure auto-balancing device that permits a rider to adjust one or more features of the aid, including, but not limited to, height, resistance, compression strength, and compression range, among others.

These and related objects of the present invention are achieved by use of a training aid for CWS auto-balancing device as described herein.

The attainment of the foregoing and related advantages and features of the invention should be more readily apparent to those skilled in the art, after review of the following more detailed description of the invention taken together with the drawings.

BRIEF DESCRIPTION OF THE DRAWINGS

FIG. 2 is a perspective view of another embodiment of a central wheel structure auto-balancing device with training aids in accordance with the present invention.

FIGS. 3 and 4 are a bottom view and an elevation view of another embodiment of a foot platform and training aid in accordance with the present invention.

FIG. 5 illustrates another embodiment of the underside of foot platform.

DETAILED DESCRIPTION

Figure 1:
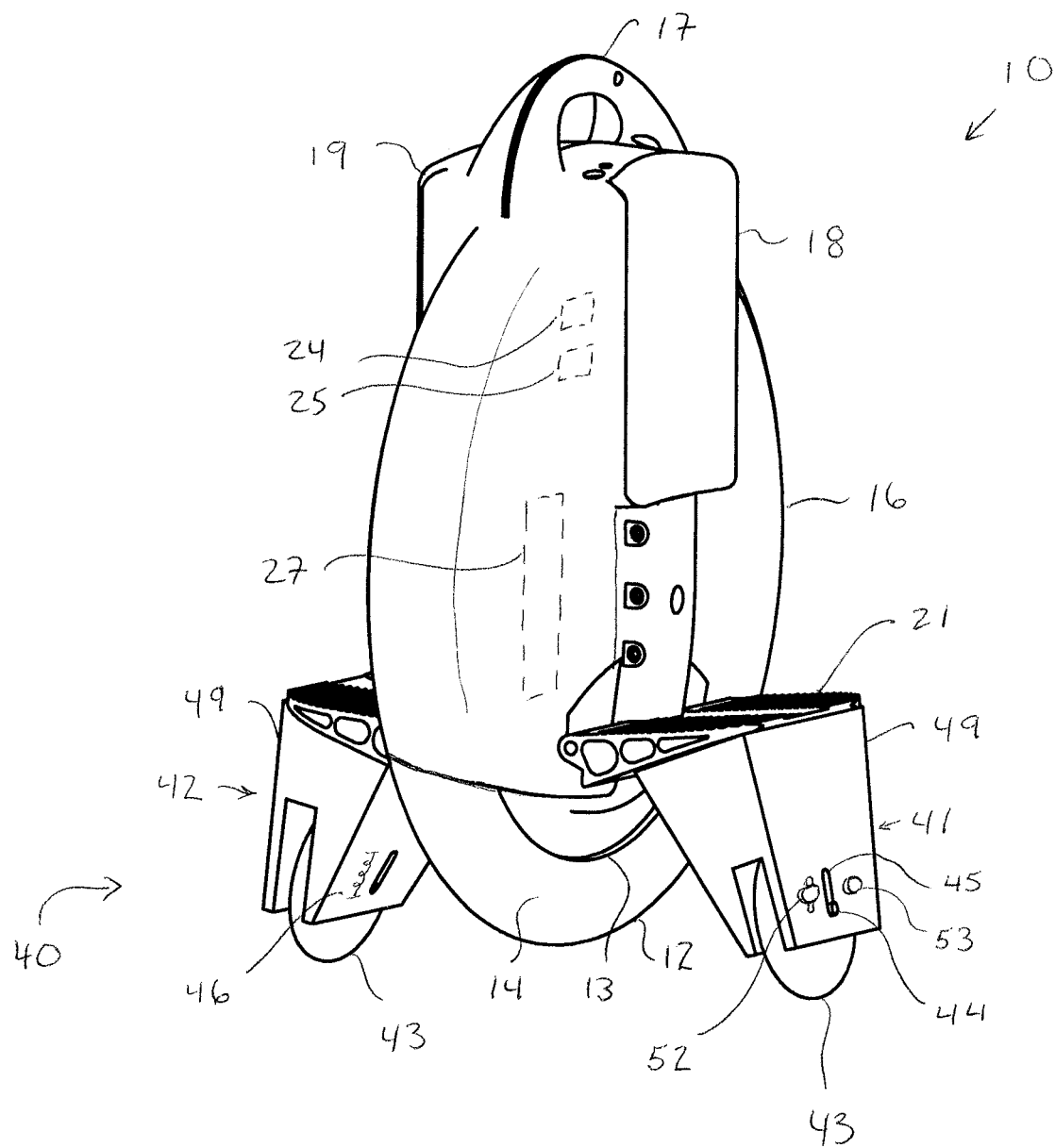
FIG. 1 is a perspective view of a central wheel structure auto-balancing device with training aids in accordance with the present invention.

Referring to FIG. 1, a perspective view of a central wheel structure auto-balancing device 10 with training aids 40 in accordance with the present invention is shown. Device 10 may be configured and operate in a manner similar to the devices of the '250 patent and other CWS auto-balancing devices. It preferably includes a wheel 12 having a rim 13 and a tire 14, two foot platforms 21,22 that may move between a deployed position (shown) and a retracted position, housing 16, handle 17 and lower leg contact surfaces or members 18,19. Device 10 also preferably includes a gyroscopic (or other) position sensor 24, control circuit 25, battery 27 and a drive motor (obscured from view). The drive motor may be a hub motor or friction drive motor or other. Sensors, control circuits, batteries and suitable motors, as well as fore-aft self-balancing control, are known in the art.

FIG. 1 illustrates training aids, generally referred to with reference numeral 40, that include a left side training aid 41 and a right side training aid 42. They may be identical and/or symmetrical or otherwise configured without departing from the present invention. In FIG. 1, the training aids are configured substantially symmetrically with one another about a central vertical plane, and include the same components and operate similarly.

Training aids 41,42 preferably include a block or frame or other support structure 49. In FIG. 1, support structure 49 is a block having a groove or recess into which a ground contact member such as wheel 43 (or other ground contact member) is positioned. The wheel axle 44 may be positioned in a slot 45 that allows up and down movement of the wheel. A bias spring 46, illustrated representatively, may bias axle 44 toward the bottom of slot 44. This allows shock absorption and/or the setting of axle 44 (and thereby wheel 43) at different heights, as described below. Adjusting the height of the wheels may better accommodate riders of different skill levels. In a preferred embodiment, even if wheel height is adjusted up, the wheel may still move vertically in the remainder of the length of slot 45 to provide shock absorption (i.e., compression).

Knob 52 allows a releasable setting of the desired height of wheel 43 within wheel support structure 49, and/or an adjustable bottom range in slot 45. Knob 53 is coupled to a brake or friction member that contacts wheel 43. Knob 53 and the brake member attached thereto may be configured to allow a rider to select the amount of resistance exerted on the wheel from fully braking (i.e., high friction/resistance) to freely rotating. In use, a rider will typically select a level somewhere between these two. Knob 53 may be a screw knob that drives a brake pad.

Thus, in use, in one embodiment, wheels 43 are not wholly freely rotating but instead offer some degree of resistance when contacting the ground. In this embodiment, when wheel 43 hits the ground, it not only provides some lateral stability, but the friction at the point of contact causes a pivoting of device 10 around that pivot point. This causes the main wheel 12 to turn towards the center of gravity and, by centrifugal force, moves the center of gravity towards the other side of device 10. Thus, the aids 41,42 teach a rider that a sharper turn helps recover balance more quickly. Accordingly, the aids become a true balance teaching device, rather than just a lateral "security" device.

That said, with wheels 43 set to freely rotate, the training aids operate similar to conventional bicycle "training wheels," hence providing security against falling side-to-side. This setting may allow a rider to become comfortable with fore-aft balancing and propulsion first. Then, with that under his or her belt, a rider can increase the resistance setting and focus on learning effective side-to-side balancing, as discussed above.

Referring to FIG. 2, another embodiment of a CWS auto-balancing device 110 having training aids in accordance with the present invention is shown. Device 110 may be similar or identical to device 10, yet as training aids 141,142 that are configured differently.

Training aids 141,142 may include a block, frame or other support structure 149 that is shaped to provide some desired side-to-side "security" yet made of a material that provides shock absorption, i.e., it is compressible, and contributes some degree of friction to teach balancing. Support structure 149 may be made of foam, or a rubberized or plasticized material, fiberglass or other suitable material. Further, the support structure 149 may be made of a first compressive material and capped (cap 155) with a second more durable material (which effective becomes the ground contacting member, though the bottom of structure 149 may inherently be the ground contacting member if so configured). For example, the block may be made of rubber or a foam rubber material and the cap may be metal or fiberglass. In this manner, the rubber/foam provides compression and the metal/fiberglass cap or pads could be replaceable and could also come in different heights (providing height adjustment) and/or resistances.

Referring to FIGS. 3 and 4, a bottom view and an elevation view of another embodiment of foot platform and training aid in accordance with the present invention are shown. The bottom of foot platform 221 may have a recess 261 into which training aid wheel 243 and its support shaft 263 fit. They may be pivotally connected at pivot shaft 262. FIG. 3 illustrates the retracted position and FIG. 4 the extended position. This arrangement may be similar, generally, to a retractable aircraft wheel or other retractable wheel arrangements.

Shaft 263 may be telescoping or otherwise arranged to allow height adjustment. Knob 252 may allow releasable height adjustment. Knob 253, coupled to axle 244, may provide adjustable resistance setting. Shaft 263 may include a spring such that the telescoping shaft components afford compression (of wheel 243 towards the platform).

FIG. 5 illustrates another embodiment of the underside of foot platform 321. This embodiment includes two slots each with lateral grooves 273 and a terminal recess 275. The training aid 41 may have two internal pins with T-shaped heads. A biased member on the backside of the training aid (obscured from view FIG. 1)) can be actuated to withdraw the T-shaped heads. When extended, however, they may be slid into their complementary slots 271 and permitted to extend into terminal recess 275 when it is reached, thereby locking the training aid onto the foot platform. The release member may be actuated by a user to withdraw the pins and remove the training aids.

Other releasable mounting techniques may be used, including but not limited to, fasteners, latches and/or clips, Velcro, or the suitable mechanisms. Alternatively, the platforms themselves may be wholly replaceable, allowing platforms with training aids attached and those without (including trainings aids of different heights and material characteristics).

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A training aid device for a central wheel structure auto-balancing device, comprising:
    a ground contact member;
    a support structure that supports the ground contact member; and
    an attachment mechanism adapted for attachment of the support structure to a central wheel structure auto-balancing device;
    wherein the support structure is configured to be compressible such that the lean of a rider, toward the side of an auto-balancing device to which the training aid device is attached causes a vertical compressing force to be applied to the support structure that compresses the support structure; and
    wherein the greater the lateral lean of a rider, the greater the compressing force exerted on the support structure and the greater the friction achieved between the ground contact member and the ground;
    the training aid device configured such that friction between the ground contact member and the ground causes a central wheel structure auto-balancing device to which the training aid device is attached to turn about a pivot point located where the ground contact member contacts the ground, and the greater the lean of a rider, the greater the friction at the pivot point and thus the sharper the turning.

2. The device of claim 1, wherein the support structure and ground contact member are formed of the same material.

3. The device of claim 2, wherein the ground contact member is formed on at least one surface of material that forms the support structure.

4. The device of claim 3, wherein the support structure and ground contact member are configured such that the ground contact member is movable spatially from the support structure.

5. The device of claim 3, wherein the support structure includes a bias mechanism.

6. The device of claim 3, wherein the ground contact member is configured to be non-rotary.

7. The device of claim 1, wherein the support structure and ground contact member are formed of different materials.

8. The device of claim 1, wherein the support structure and ground contact member are biased to a first position and configured such that application of a vertical compressing force deforms the support structure, the support structure returning to the first position when the vertical compressing force is removed.

9. The device of claim 1, wherein the ground contacting member is a wheel.

10. The device of claim 1, wherein the ground contact member is a wheel and the device further comprises a braking mechanism that applies a friction force against rotation of the wheel, and wherein the greater the friction force, the sharper the turning of an auto-balancing device to which the training aid device is attached.

11. The device of claim 10, wherein the friction force applied by the braking mechanism is rider selectable.

12. The device of claim 10, wherein the braking mechanism is configured to increase the friction force exerted against rotation of the wheel when a rider increases the amount of weight applied to the device.

13. The device of claim 1, wherein the attachment mechanism is adapted for coupling to a foot platform of a central wheel structure auto-balancing device.

14. The device of claim 1, wherein the ground contact member is configured to be non-rotary.

15. The device of claim 1, wherein the training aid device is configured to afford rider selection of the height of the ground contact member above the height of ground upon which the auto-balancing device is ridden.

16. The device of claim 1, wherein the position of the ground contact member relative to the support structure is changeable.

17. A training aid device for a central wheel structure auto-balancing device, comprising:
a ground contact member;
a support structure that supports the ground contact member; and
an attachment mechanism adapted for attachment of the support structure to a central wheel structure auto-balancing device;
wherein the support structure and ground contact member are biased towards a first position and configured such that the lean of a rider, toward the side of an auto-balancing device to which the training aid device is attached, causes a deforming force to be applied to the support structure, the support structure returning to their first position when the deforming force is removed;
wherein the training aid device creates a pivot point for turning an auto-balancing device to which the training aid device is attached, the pivot point located where the ground contact member contacts the ground, and wherein the greater the lean of a rider onto the training aid device, the greater the friction achieved at the pivot point and thus the sharper the turning of an attached auto-balancing device.

18. The device of claim 17, wherein the attachment mechanism is adapted for coupling to a foot platform of a central wheel structure auto-balancing device.

19. The device of claim 17, wherein the support structure and the ground contact member are made of the same material.

20. A training aid device for a central wheel structure auto-balancing device, comprising:
a ground contact member that includes a wheel;
a support structure that supports the ground contact member; and
an attachment mechanism adapted for attachment of the support structure to a central wheel structure auto-balancing device; and
a friction force mechanism that applies friction against rotation of the wheel, the friction force mechanism configured to allow rider pre-selection of the amount of friction applied against rotation of the wheel;
the training aid device configured such that contact of the ground contact member with ground defines a pivot point about which a central wheel structure auto-balancing device attached to the training aid device turns when the ground contact member contacts the ground.

21. The device of claim 20, wherein the position of the wheel relative to the support structure is movable spatially.

* * * * *